US012661951B2

(12) United States Patent
Han et al.

(10) Patent No.: US 12,661,951 B2
(45) Date of Patent: Jun. 23, 2026

(54) AIR CONDITIONING SYSTEM FOR MOBILITY VEHICLE

(71) Applicants:Hyundai Motor Company, Seoul (KR); Kia Corporation, Seoul (KR); DOOWON CLIMATE CONTROL CO., LTD., Asan-si (KR)

(72) Inventors: Kwang Ok Han, Seoul (KR); Myung Hoe Kim, Seoul (KR); Su Yeon Kang, Seoul (KR); Kwang Woon Cho, Yongin-si (KR); Hyo Geun Oh, Cheongju-si (KR); Won Jun Joung, Uiwang-si (KR); Byung Guk An, Asan-si (KR)

(73) Assignees: HYUNDAI MOTOR COMPANY, Seoul (KR); KIA CORPORATION, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 141 days.

(21) Appl. No.: 18/388,113

(22) Filed: Nov. 8, 2023

(65) Prior Publication Data

US 2025/0010688 A1 Jan. 9, 2025

(30) Foreign Application Priority Data

Jul. 3, 2023 (KR) ........................ 10-2023-0085756

(51) Int. Cl.
*B60H 1/00* (2006.01)
*B60H 3/00* (2006.01)

(52) U.S. Cl.
CPC ..... *B60H 1/00692* (2013.01); *B60H 1/00835* (2013.01); *B60H 1/00849* (2013.01);
(Continued)

(58) Field of Classification Search
CPC ............ B60H 1/00692; B60H 1/00835; B60H 1/00849; B60H 3/0085; B60H 1/00764;
(Continued)

(56) References Cited

U.S. PATENT DOCUMENTS

| 4,607,497 A | * | 8/1986 | Ferdows | ............ B60H 1/00542 |
| | | | | 62/DIG. 16 |
| 4,732,011 A | * | 3/1988 | Haiya | ................ B60H 1/00371 |
| | | | | 62/244 |

(Continued)

FOREIGN PATENT DOCUMENTS

| CN | 105682951 B | * | 9/2017 | ............... B60H 1/12 |
| CN | 106132737 B | * | 4/2018 | ......... B60H 1/00064 |

(Continued)

*Primary Examiner* — Ljiljana V. Ciric
(74) *Attorney, Agent, or Firm* — Fish & Richardson P.C.

(57) ABSTRACT

In an air conditioning system for a mobility vehicle, air is introduced into a housing in multiple directions including forward, rearward, leftward, and rightward directions, such that outside air is introduced into a heat exchanger in the housing and heat exchange is performed regardless of the traveling direction of the mobility vehicle. In addition, the amount of outside air to be provided to an external heat exchanger is adjusted depending on the traveling direction of the mobility vehicle or on whether a heat pump is used.

15 Claims, 9 Drawing Sheets

(52) U.S. Cl.
CPC . *B60H 3/0085* (2013.01); *B60H 2001/00085* (2013.01); *B60H 2001/00235* (2013.01); *B60H 1/00764* (2013.01)

(58) Field of Classification Search
CPC .......... B60H 2001/00085; B60H 2001/00235; B60H 1/00007; B60H 1/00028; B60H 1/00321; B60H 1/00507; B60H 2001/00078; B60H 2001/00107; B60H 1/00207; B60H 1/00371; B60H 1/00428; B60H 1/00857
See application file for complete search history.

(56) References Cited

U.S. PATENT DOCUMENTS

| | | | | |
|---|---|---|---|---|
| 4,926,655 A * | 5/1990 | King | | F25D 19/003 |
| | | | | 62/244 |
| 5,005,372 A * | 4/1991 | King | | B61D 27/0018 |
| | | | | 62/244 |
| 5,184,474 A * | 2/1993 | Ferdows | | B60H 1/00371 |
| | | | | 62/428 |
| 5,220,808 A * | 6/1993 | Mayer | | B61D 27/0018 |
| | | | | 62/244 |
| 5,632,330 A * | 5/1997 | Drucker | | B60H 1/00371 |
| | | | | 165/44 |
| 5,876,277 A * | 3/1999 | Uemura | | B60H 1/00849 |
| | | | | 454/158 |
| 6,282,912 B1 * | 9/2001 | Mannerheim | | B60H 1/00371 |
| | | | | 62/244 |
| 6,296,562 B1 * | 10/2001 | Uemura | | B60H 1/00692 |
| | | | | 454/159 |
| 6,383,071 B1 * | 5/2002 | Takeuchi | | B60H 1/00857 |
| | | | | 454/333 |
| 6,415,620 B1 * | 7/2002 | Ferdows | | B60H 1/00542 |
| | | | | 62/244 |
| 6,609,563 B1 * | 8/2003 | Tsurushima | | B60H 1/00692 |
| | | | | 165/72 |
| 6,669,549 B2 * | 12/2003 | Uemura | | B60H 1/00692 |
| | | | | 454/159 |
| 6,763,670 B1 * | 7/2004 | Bushnell | | B60H 1/00542 |
| | | | | 62/200 |
| 6,814,138 B2 * | 11/2004 | Tsurushima | | B60H 1/00692 |
| | | | | 165/81 |
| 8,403,029 B2 * | 3/2013 | Nanaumi | | B60H 1/00028 |
| | | | | 165/41 |
| 8,808,073 B2 * | 8/2014 | Tokunaga | | B60H 1/00692 |
| | | | | 454/339 |
| 9,434,234 B2 * | 9/2016 | Suzuki | | B60H 1/00692 |
| 9,616,729 B2 * | 4/2017 | Chiba | | B60H 1/00857 |
| 10,414,247 B2 * | 9/2019 | Jee | | B03C 3/68 |
| 10,479,170 B2 * | 11/2019 | Enomoto | | B60H 1/00428 |
| 10,618,377 B2 * | 4/2020 | Nolta | | B60H 1/00857 |
| 10,696,125 B2 * | 6/2020 | Ito | | B60H 1/034 |
| 10,866,000 B2 * | 12/2020 | Jung | | F24F 11/745 |
| 11,225,127 B2 * | 1/2022 | Jee | | B60H 3/0078 |
| 11,292,312 B2 * | 4/2022 | Lee | | B60H 1/00028 |
| 11,654,745 B2 * | 5/2023 | Yonezu | | B60H 1/00021 |
| | | | | 62/426 |
| 11,794,552 B2 * | 10/2023 | Park | | B60H 1/0073 |
| 12,397,615 B2 * | 8/2025 | Han | | B60H 1/00764 |
| 2009/0023374 A1 * | 1/2009 | Suzuki | | B60H 1/00692 |
| | | | | 454/126 |
| 2013/0260663 A1 * | 10/2013 | Kaiyama | | B60H 1/00457 |
| | | | | 454/155 |
| 2019/0111768 A1 * | 4/2019 | Komatsubara | | B60H 3/02 |
| 2021/0053414 A1 * | 2/2021 | Lee | | B60H 1/00028 |
| 2023/0040086 A1 * | 2/2023 | Park | | B60H 1/00842 |
| 2025/0010688 A1 * | 1/2025 | Han | | B60H 1/00692 |
| 2025/0206100 A1 * | 6/2025 | Oh | | B60H 1/00671 |

FOREIGN PATENT DOCUMENTS

| | | | | | |
|---|---|---|---|---|---|
| CN | 111516453 A | * | 8/2020 | | B60H 1/00664 |
| DE | 19611016 A1 | * | 9/1996 | | B60H 1/00835 |
| DE | 102004054570 A1 | * | 6/2005 | | B60H 1/00428 |
| DE | 19807002 B4 | * | 11/2006 | | B60H 1/00692 |
| DE | 60029667 T2 | * | 12/2006 | | B60H 1/00692 |
| DE | 102007001877 A1 | * | 10/2007 | | B60H 1/00028 |
| DE | 102009024388 A1 | * | 12/2009 | | B60H 1/00692 |
| DE | 102006039286 B4 | * | 4/2010 | | B60H 1/0005 |
| DE | 102012200301 A1 | * | 9/2012 | | B60H 1/00692 |
| DE | 112014004877 T5 | * | 7/2016 | | B60H 1/00692 |
| DE | 112014004996 T5 | * | 7/2016 | | B60H 1/00064 |
| DE | 112015001395 T5 | * | 12/2016 | | B60H 1/00064 |
| DE | 112014004996 B4 | * | 7/2018 | | B60H 1/00692 |
| DE | 102012200301 B4 | * | 5/2022 | | B60H 1/00692 |
| DE | 102009024388 B4 | * | 1/2023 | | B60H 1/00692 |
| EP | 1044833 B1 | * | 8/2006 | | B60H 1/00692 |
| EP | 3376123 B1 | * | 2/2021 | | F24F 11/79 |
| JP | 3951926 B2 | * | 8/2007 | | B60H 1/00692 |
| JP | 4016749 B2 | * | 12/2007 | | |
| JP | 2009023590 A | * | 2/2009 | | F24F 13/04 |
| JP | 4396738 B2 | * | 1/2010 | | B60H 1/00028 |
| JP | 4513835 B2 | * | 7/2010 | | F24F 13/04 |
| JP | 5977975 B2 | * | 8/2016 | | B60H 1/00692 |
| JP | 2023173297 A | * | 12/2023 | | B61D 17/12 |
| KR | 20030047803 A | * | 6/2003 | | B60H 1/00028 |
| KR | 20040035253 A | * | 4/2004 | | |
| KR | 10-2010-0028739 | | 3/2010 | | |
| KR | 20170094017 A | * | 8/2017 | | B60H 1/00842 |
| KR | 102502642 B1 | * | 2/2023 | | B60H 1/00878 |
| WO | WO-2018066201 A1 | * | 4/2018 | | B60H 1/00692 |
| WO | WO-2020161439 A1 | * | 8/2020 | | B60H 1/00878 |

* cited by examiner

AIR CONDITIONING SYSTEM FOR MOBILITY VEHICLE

CROSS-REFERENCE TO RELATED APPLICATION

The present application claims priority of Korean Patent Application No. 10-2023-0085756, filed on Jul. 3, 2023, the entire contents of which are incorporated herein for all purposes by this reference.

TECHNICAL FILED

The present disclosure relates to an air conditioning system for a mobility vehicle that adjusts the amount of outside air to be provided to an external heat exchanger on based on a traveling direction of a mobility vehicle or whether a heat pump is used.

BACKGROUND

An air conditioning device may include a front air conditioning device and is configured such that cooling air or heating air is discharged from discharge ports formed in an instrument panel disposed at a front side of an interior of a mobility vehicle. In some cases of a mobility vehicle with a large interior space, a cooling or heating effect may not sufficiently affect a rear seat.

In some cases, to assist the performance in cooling or heating the rear seat, a rear seat air conditioning device may be applied or a roof-type air conditioning device, which is installed on a roof of the mobility vehicle and configured to discharge air-conditioning air from above an occupant's head, is applied.

For example, the roof-type air conditioning device has an external heat exchanger configured to exchange heat with outside air, and the external heat exchanger is also installed on the roof. However, there is a limitation in ensuring the amount of outside air to be provided to the external heat exchanger within a limited space on the roof.

In addition, recently, various autonomous mobility vehicles have been developed, and the autonomous mobility vehicle may travel in various directions as well as a forward/rearward direction. In some cases, a portion through which outside air is introduced may be restrictively provided at the front side, which makes it difficult to sufficiently introduce outside air to the external heat exchanger of the roof-type air conditioning device.

SUMMARY

The present disclosure describes an air conditioning system for a mobility vehicle that improves efficiency in operating an external heat exchanger by adjusting the amount of outside air to be provided to the external heat exchanger on based on a traveling direction of a mobility vehicle or whether a heat pump is used.

According to one aspect of the subject matter described in this application, an air conditioning system for a mobility vehicle includes: a housing having an air inlet port and an air discharge port, the air inlet port extending along a rim of the housing; a heat exchange unit provided in the housing; a door installed on the housing and configured to be movable upward or downward and open or close the air inlet port in accordance with a movement position; a drive unit connected to a door and configured to adjust a position of the door in an upward/downward direction; and a controller configured to control the drive unit on based on preset logic for each situation.

The air inlet port may be formed in a lateral portion of the housing, the air discharge port may be formed in an upper or lower portion of the housing, and the heat exchange unit may be disposed such that air, which flows from the air inlet port to the air discharge port, passes through the heat exchange unit.

The drive unit may include: a drive motor installed in the housing and configured to generate driving power; and a movable member connected to the drive motor and the door and configured to move the door in the upward/downward direction while moving upward or downward when the driving power is inputted by the drive motor.

The drive motor may be configured to generate a rotational force, the movable member may extend to traverse the inside of the door and be connected to the drive motor, gears may be respectively provided at one end and the other end of the movable member, and the door may have engagement end parts that engage with the gears.

The movable member may be formed in a rod shape, and the door may have a guide slit into which the movable member is inserted.

Rack gears may be formed in the upward/downward direction on the engagement end parts of the door, and the gears at one end and the other end of the movable member may respectively engage with the rack gears.

The movable member may extend to traverse a portion disposed inside the door and having a small width.

The housing may have a plurality of supports that traverses the air inlet port in the upward/downward direction, and the respective supports may be disposed to be spaced apart from one another at predetermined intervals.

A first rib may be formed inside an edge of the door, and a second rib may extend along a rim of an outer or inner surface of the door.

The controller may control the drive unit to open the door when a traveling speed of the mobility vehicle is a preset speed or higher.

The controller may gradually decrease an opening degree of the door when the mobility vehicle further accelerates in the state in which the traveling speed of the mobility vehicle is the preset speed or higher, and the controller may gradually increase the opening degree of the door when the mobility vehicle decelerates.

The heat exchange unit may include a heat exchanger through which a refrigerant circulates, and the controller may control the drive unit to adjust an opening degree of the door on based on the amount of heat exchange by the heat exchanger.

The controller may control the drive unit to open the door when a cleaning mode for removing foreign substances in the housing is performed.

The controller may control the drive unit to adjust an operation of opening or closing the door in accordance with logic for each previous situation when a preset predetermined time elapses after the cleaning mode is performed.

The heat exchange unit may include a heat exchanger and a blower, and when the mobility vehicle travels, the controller may perform the cleaning mode and control the blower so that the blower does not operate.

According to the air conditioning system for a mobility vehicle structured as described above, the air may be introduced into the housing embedded with the heat exchanger in multiple directions including the forward, rearward, leftward, and rightward directions. Therefore, the outside air may be introduced into the heat exchanger and perform the heat exchange regardless of the traveling direction of the mobility vehicle. In addition, the amount of outside air to be provided to the external heat exchanger is adjusted depending on the traveling direction of the mobility vehicle or whether the heat pump is used, which improves the efficiency in operating the external heat exchanger.

DETAILED DESCRIPTION

Figure 1:
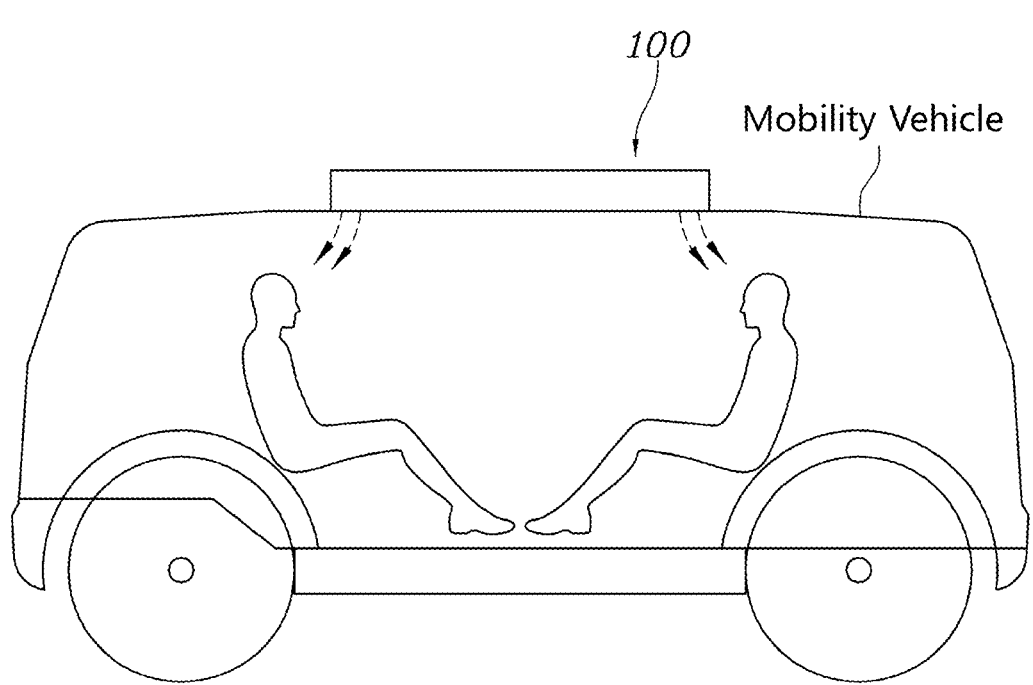
FIG. 1 is a view illustrating an example of a mobility vehicle to which a roof-type air conditioning device is applied.
Figure 2:
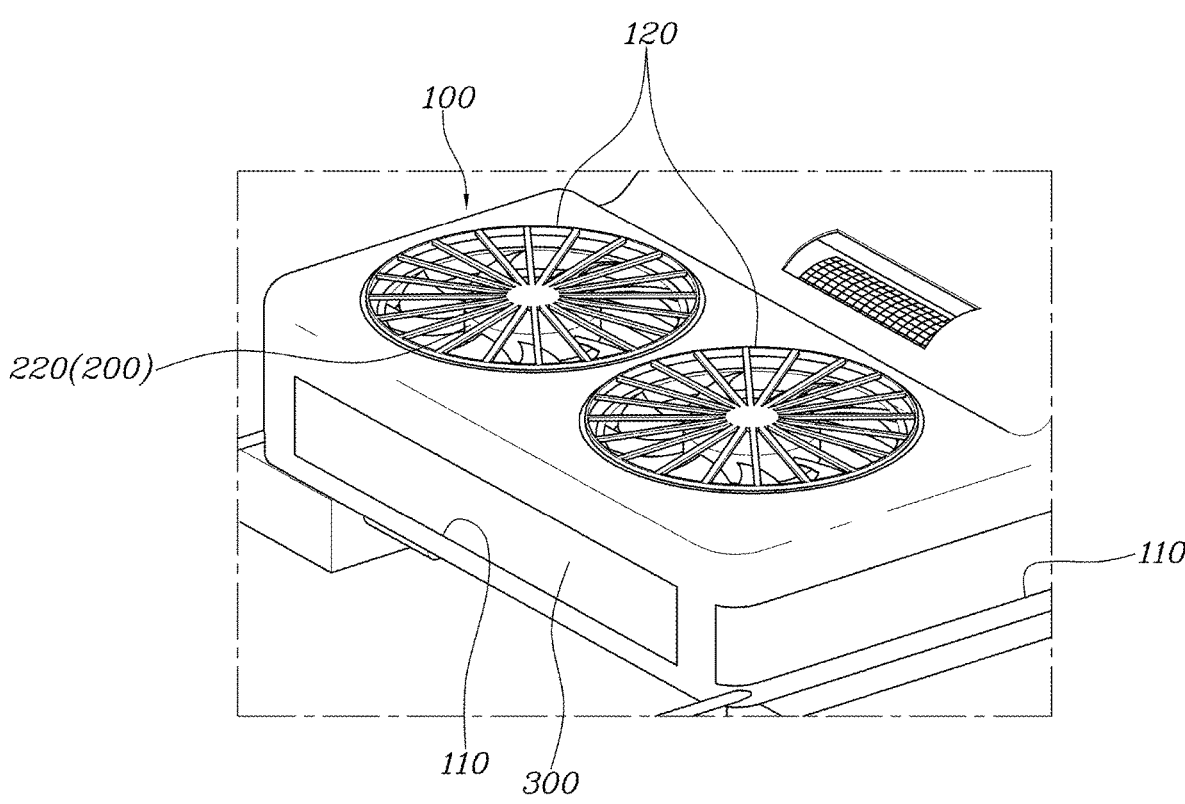
FIG. 2 is a view illustrating an example of an air conditioning system for a mobility vehicle.
Figure 3:
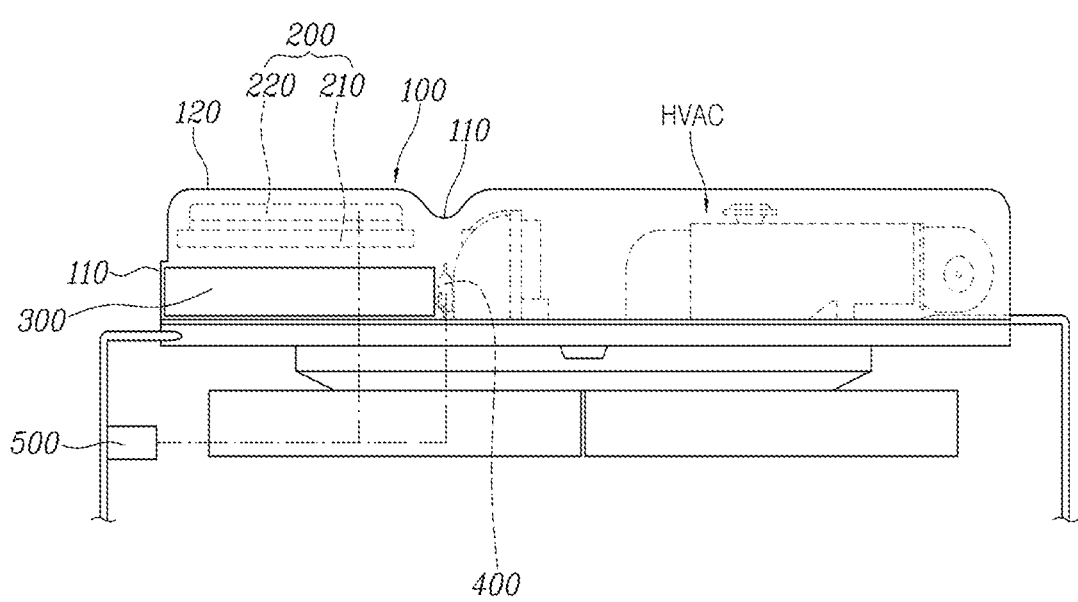
FIG. 3 is a side view of the air conditioning system for a mobility vehicle illustrated in FIG. 1.
Figure 4:
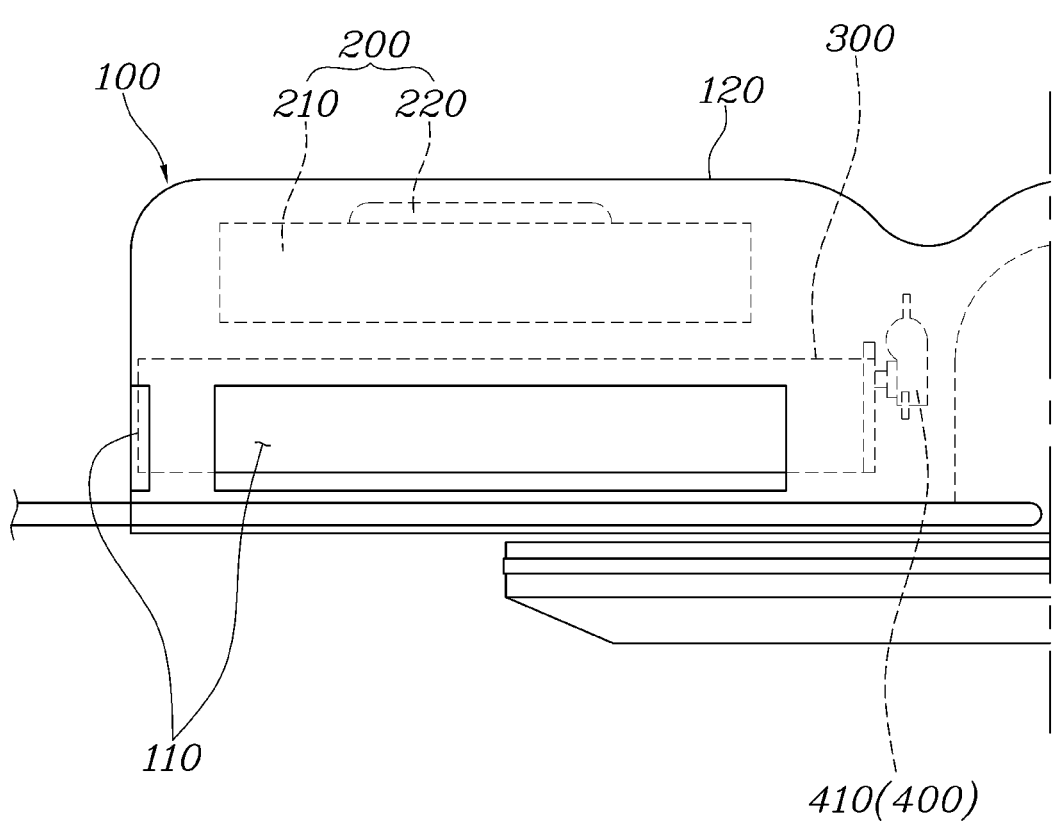
FIG. 4 is a view illustrating an example state in which a door closes an air inlet port.

Hereinafter, one or more implementations will be described in detail with reference to the accompanying drawings. The same or similar constituent elements are assigned with the same reference numerals regardless of reference numerals, and the repetitive description thereof will be omitted.

In some implementations, a controller may include a communication device configured to communicate with another control unit or a sensor to control a corresponding function, a non-transitory memory configured to store an operating system, a logic instruction, and input/output information, and one or more processors configured to perform determination, computation, decision, or the like to control the corresponding function.

Hereinafter, an air conditioning system for a mobility vehicle according to an exemplary implementation of the present disclosure will be described with reference to the accompanying drawings.

In some implementations, as illustrated in FIGS. 1 to 7, an air conditioning system for a mobility vehicle can include: a housing 100 installed at an upper or lower side of a mobility vehicle and having air inlet ports 110 and air discharge ports 120, the air inlet port 110 extending along a rim of the housing 100; a heat exchange unit 200 provided in the housing 100; a door 300 installed on the housing 100 and configured to be movable upward or downward and open or close the air inlet port 110 in accordance with a movement position; a drive unit 400 installed in the housing 100, connected to the door 300, and configured to adjust a position of the door 300 in an upward/downward direction; and a controller 500 configured to control the drive unit 400 on based on preset logic for each situation.

The housing 100 may be installed at the upper side of the mobility vehicle and constitute a roof-type air conditioning system.

The housing 100 has the air inlet port 110 through which air is introduced, and the air discharge port 120 through which the air introduced into the housing 100 is discharged.

In particular, the air conditioning system of the present disclosure is configured such that the air may be introduced into the housing 100 even in any direction such as a forward/rearward direction and a leftward/rightward direction of the mobility vehicle. The air inlet port 110 extends along the rim of the housing 100. Therefore, the air may be introduced into the housing 100 through the air inlet ports 110 in the forward, leftward, rightward, and rearward directions of mobility vehicle, such that the air may be introduced into the housing 100 regardless of a traveling direction of the mobility vehicle.

In some examples, the housing 100 further has a space in which inside air flows separately from a flow of outside air. An HVAC including a blower device and an internal heat exchanger may be further provided in the space.

The heat exchange unit 200 may be provided in the housing 100 and include a heat exchanger 210 and a blower 220. The heat exchanger 210 may be an external heat exchanger and configured to circulate a refrigerant. The blower 220 may be configured to forcibly blow the air. The heat exchanger 210 may exchange heat with the outside air flowing in the housing 100 and implement a heat pump in conjunction with refrigerant circulation components provided in a refrigerant circuit.

In some examples, the door 300 is installed on the housing 100 and configured to open or close the air inlet port 110. The door 300 is installed on the housing 100 and configured to be movable upward or downward, such that the door 300 may open or close the air inlet port 110. The door 300 may be provided in the form of a frame extending along an inner periphery of the housing 100. Therefore, the door 300 opens the air inlet port 110 by moving upward and closes the air inlet port 110 by moving downward. The door 300 may have an empty space formed therein, thereby preventing interference with the other components including the heat exchange unit 200.

The opening/closing operation of the door 300 may be performed by the drive unit 400 provided in the housing 100.

The drive unit 400 is installed in the housing 100 and connected to the door 300. In addition, the drive unit 400 is an operational structure that generates driving power for adjusting the position of the door 300. Various power transmission structures such as a gear connection structure and an actuator connection structure may be applied.

Therefore, the controller 500 may control the drive unit 400 and determine the amount of outside air to be introduced into the housing 100 on based on the opening/closing position of the door 300.

That is, control logic according to situations such as traveling speeds, traveling directions, and whether the heat pump is used may be provided in the controller 500, and the controller 500 may adjust and open or close the door 300 in accordance with the situation. Therefore, the controller 500 may optimally manage a temperature of the heat exchanger 210 in accordance with the respective situations by changing the amount of outside air to be introduced through the air inlet port 110.

The present disclosure will be specifically described. The air inlet port 110 may be provided in a lateral portion of the housing 100, the air discharge port 120 may be provided in the upper or lower portion of the housing 100, and the heat exchange unit 200 may be disposed such that the air, which flows from the air inlet port 110 to the air discharge port 120, passes through the heat exchange unit 200.

Because the air inlet port 110 is provided in the lateral portion of the housing 100 as described above, it is possible to ensure the amount of outside air to be introduced through the air inlet port 110 when the mobility vehicle travels. In addition, because the air discharge port 120 is provided in the upper or lower portion of the housing 100, the outside air introduced through the air inlet port 110 moves toward the air discharge port 120, such that the flow of outside air is stabilized.

In addition, the air inlet port 110 and the air discharge port 120 are disposed in the housing 100 while having a height deviation in the upward/downward direction, and the heat exchange unit 200 is disposed between the air inlet port 110 and the air discharge port 120, such that the outside air, which flows from the air inlet port 110 to the air discharge port 120, may pass through the heat exchange unit 200.

Figure 6:
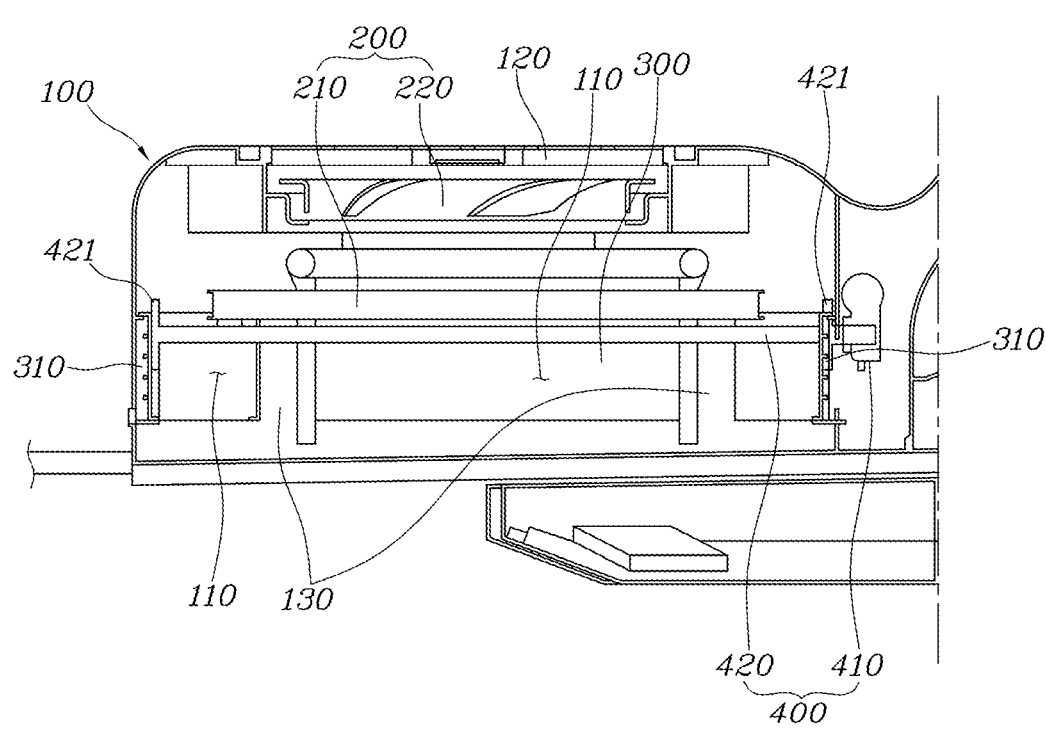
FIG. 6 is a view illustrating an example of an interior of the air conditioning system for a mobility vehicle illustrated in FIG. 1.
Figure 7:
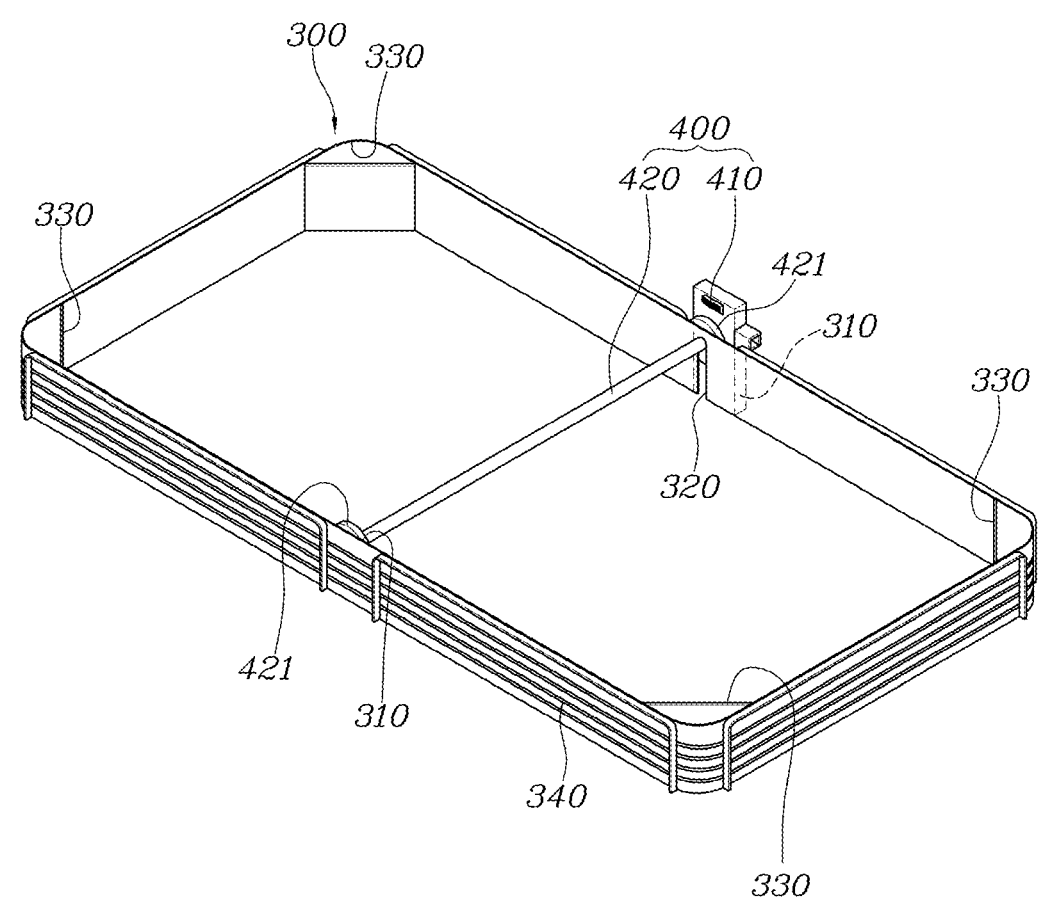
FIG. 7 is a view illustrating the door and a drive unit of the air conditioning system for a mobility vehicle illustrated in FIG. 1.
Figure 8:
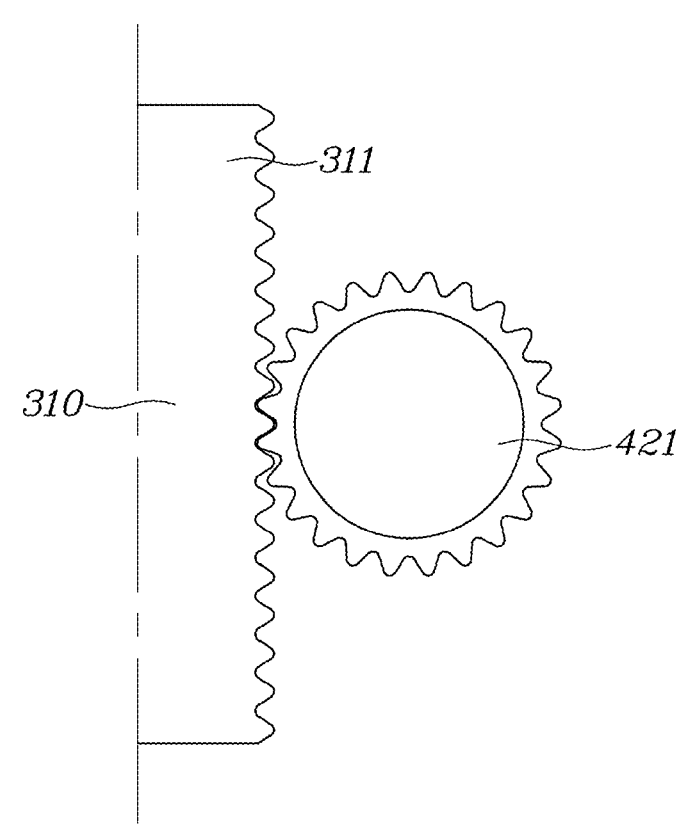
FIG. 8 is a view illustrating an example of a connection structure between a movable member and an engagement end of the door.

In some examples, as illustrated in FIGS. 6 to 8, the drive unit 400 may include a drive motor 410 installed in the housing 100 and configured to generate driving power, and a movable member 420 connected to the drive motor 410 and the door 300 and configured to allow the door 300 to move in the upward/downward direction while moving upward or downward when the driving power is inputted by the drive motor 410.

The drive unit 400 includes the drive motor 410 and the movable member 420. The movable member 420 moves the door 300 in the upward/downward direction while moving by receiving the driving power of the drive motor 410.

The drive motor 410 may be installed in the housing 100 and positioned outside the door 300 together with the movable member 420. The drive motor 410 may be provided as a plurality of drive motors 410 to additionally ensure driving power for moving the position of the door 300.

The movable member 420 is connected to the door 300. When the power is transmitted through the drive motor 410, the movable member 420 allows the door 300 to move in the upward/downward direction.

Specifically, the drive motor 410 may be configured to generate a rotational force. The movable member 420 may extend to traverse the inside of the door 300 and be connected to the drive motor 410. Gears 421 may be respectively provided at one end and the other end of the movable member 420. Engagement end parts 310, which engage with the gears 421, may be provided on the door 300.

That is, the drive motor 410 and the movable member 420 are connected to each other by the gear structure. When the drive motor 410 generates the rotational force, the movable member 420 receives the rotational force and rectilinearly moves in the upward/downward direction, such that the position of the door 300 may be adjusted in the upward/downward direction.

In this case, the movable member 420 extends to traverse the inside of the door 300, such that a state in which the door 300 is connected to the movable member 420 in a balanced manner may be maintained, and the door 300 may stably move in the upward/downward direction without being biased toward any one side when the movable member 420 moves.

The movable member 420 may be formed in a rod shape, and the door 300 may have a guide slit 320 into which the movable member 420 is inserted.

In addition, the movable member 420 extends to traverse a portion having a small width and disposed inside the door 300, such that a length of the movable member 420 may be reduced, thereby ensuring the rigidity thereof and reducing the manufacturing costs.

As described above, the movable member 420 may be formed in a rod shape and extend to traverse the inside of the door 300. In this case, the door 300 may have the guide slit 320 extending upward from the lower end of the door 300, and the movable member 420 may be inserted into the guide slit 320. In particular, the guide slit 320 may be formed such that the movable member 420 is positioned at an uppermost end of the guide slit 320 when the door 300 moves downward and closes the air inlet port 110, and the movable member 420 is positioned at a lowermost end of the guide slit 320 when the door 300 moves upward and opens the air inlet port 110.

Therefore, when the door 300 rectilinearly moves in the upward/downward direction as the movable member 420 rotates, the movable member 420 is kept inserted into the guide slit 320, such that the upward and downward motions of the door 300 are guided in the extension direction of the guide slit 320, and a tilting motion of the door 300 is suppressed. Therefore, a supporting force is ensured in the state in which the air inlet port 110 is closed.

In addition, the gears 421 are respectively provided at one end and the other end of the movable member 420, and the engagement end parts 310, which engage with the gears 421, are provided on the door 300. When the movable member 420 rotates as the drive motor 410 operates, the gear 421 rotates and moves in the upward/downward direction along the engagement end part 310 in the state in which the gear 421 engages with the engagement end part 310.

Specifically, rack gears 311 may be provided in the upward/downward direction on the engagement end parts 310 of the door 300, and the gears 421 respectively provided at one end and the other end of the movable member 420 may respectively engage with the rack gears 311.

For example, as illustrated in FIG. 8, the rack gear 311 is provided in the upward/downward direction on the engagement end part 310, and gear protrusions, which engage with the rack gear 311, are formed on a peripheral surface of the movable member 420. When the gear 421 rotates together with the movable member 420, the engagement end part 310 is rectilinearly moved in the upward/downward direction by the rotational motion of the gear 421. Therefore, the door 300 may open or close the air inlet port 110 by moving upward or downward in conjunction with the operation of the drive unit 400.

In some implementations, as a detailed structure of the drive unit 400, the drive motor 410 has a piston configured to rectilinearly move upward or downward, and the movable member 420 moves upward or downward in conjunction with a movement of the piston. Various implementations may be applied to adjust the position of the door 300 in the upward/downward direction by the drive unit 400.

Figure 5:
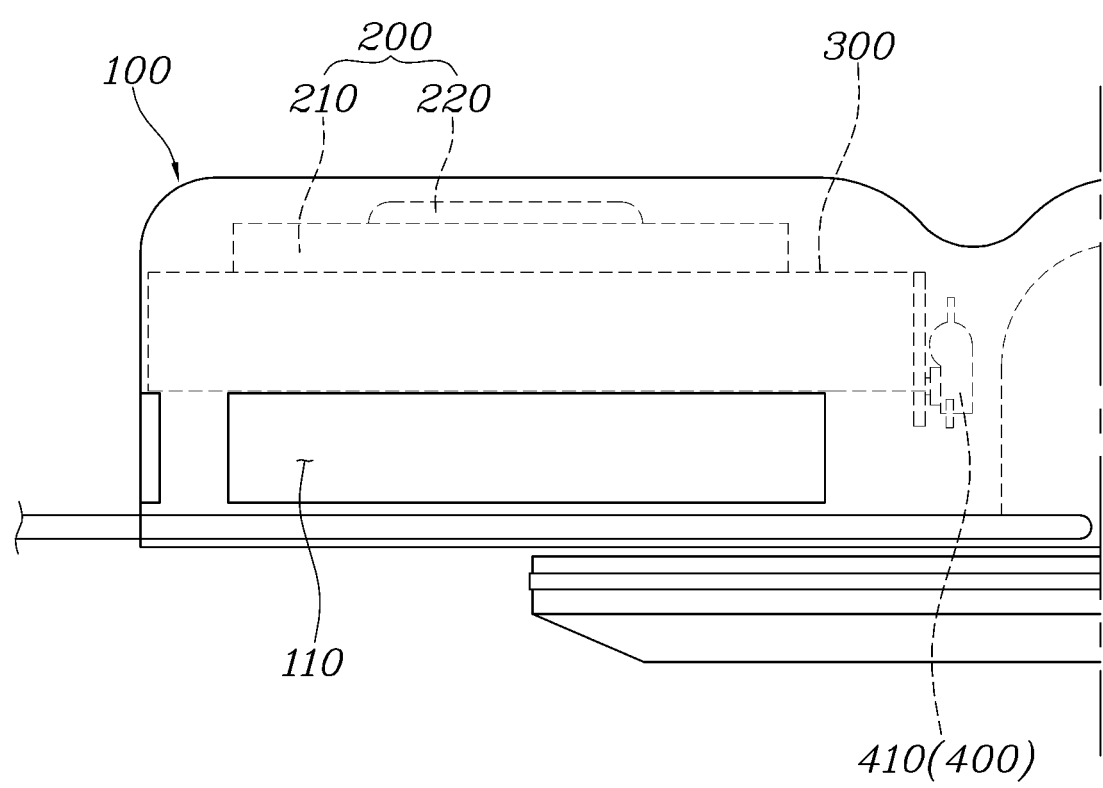
FIG. 5 is a view illustrating an example state in which the door opens the air inlet port.

In some examples, as can be seen from FIGS. 5 and 6, a plurality of supports 130 may be provided in the housing 100 and traverse the air inlet port 110 in the upward/downward direction. The respective supports 130 may be disposed to be spaced apart from one another at predetermined intervals.

As the air inlet port 110 extends along the rim of the lateral portion of the housing 100, spaces, which are spaced apart from each other in the upward/downward direction, are defined in the housing 100. Therefore, the supports 130, which traverse the air inlet port 110 in the upward/downward direction, may be provided in the housing 100 and reinforce the rigidity of the empty space defined by the air inlet port 110, thereby ensuring an overall rigidity of the housing 100. The supports 130 may be disposed in the air inlet port 110 and spaced apart from one another at predetermined intervals. The number of supports 130 or the thickness of the support 130 may be determined depending on the rigidity of the housing 100 and the amount of outside air to be introduced through the air inlet port 110.

In addition, as can be seen from FIG. 7, a first rib 330 may be formed inside the edge of the door 300, and a second rib 340 may extend along a rim of an outer or inner surface of the door 300.

The door 300 can be configured to withstand vehicle-induced wind when the mobility vehicle travels. In particular, because the door 300 of the present disclosure may be applied to the mobility vehicle that may travel in multiple directions including the forward, rearward, leftward, and rightward directions, the overall rigidity of the door 300 can be ensured.

Therefore, the first rib 330 may be formed inside the edge of the door 300, and the second rib 340 may be formed along the rim of the outer surface of the door 300, thereby preventing the bending deflection and ensuring the rigidity. Therefore, when the door 300 is positioned to close the air inlet port 110, the air inlet port 110 may be kept in the closed state even when the mobility vehicle travels at high speed.

Figure 9:
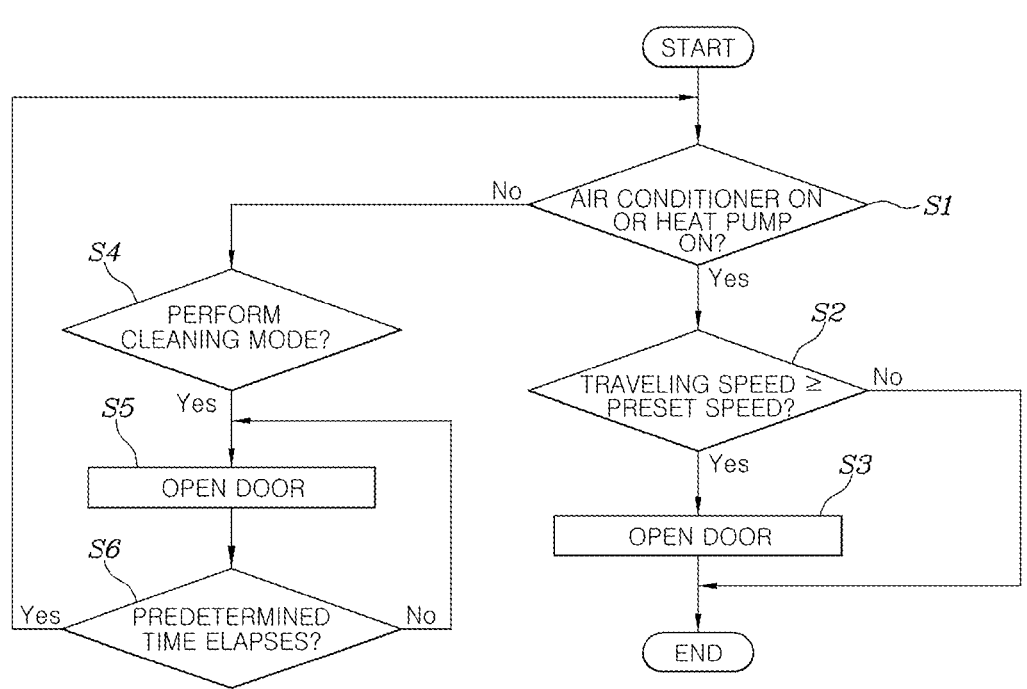
FIG. 9 is a control flowchart of an example method of the air conditioning system for a mobility vehicle.

In some examples, the controller 500 may adjust the position of the door 300 by controlling the drive unit 400 for each situation in accordance with steps S1 to S6 of the flowchart illustrated in FIG. 9.

The controller 500 may control the drive unit 400 to open the door 300 in case that a traveling speed of the mobility vehicle is a preset speed or higher.

In this case, the preset speed is set to determine whether the mobility vehicle travels at high speed. When the controller 500 determines that the traveling speed of the mobility vehicle is the preset speed or higher and the mobility vehicle travels at high speed, the controller 500 determines whether to open the door 300. The air inlet port 110 may be formed to introduce the air regardless of the traveling direction of the mobility vehicle. Therefore, when the traveling speed of the mobility vehicle is the preset speed or higher, the air inlet port 110 is opened, such that the outside air is introduced into the housing 100 through the air inlet port 110.

When the door 300 is opened as the traveling speed of the mobility vehicle is the preset speed or higher as described above, the vehicle-induced wind may be introduced into the housing 100, such that the outside air may exchange heat with the heat exchange unit 200.

In addition, in case that the mobility vehicle further accelerates in the state in which the traveling speed of the mobility vehicle is the preset speed or higher, the controller 500 gradually decreases an opening degree of the door 300. In case that the mobility vehicle decelerates, the controller 500 gradually increases the opening degree of the door 300.

That is, the opening degree of the door 300 gradually decreases in accordance with the traveling speed in case that the mobility vehicle further accelerates in the state in which the traveling speed of the mobility vehicle is the preset speed or higher. Therefore, the heat exchanger 210 may be prevented from being overcooled by an excessive increase in amount of outside air introduced into the housing 100 when the mobility vehicle travels at high speed, and the resistance caused by vehicle-induced wind may be reduced, such that the traveling stability may be ensured.

In addition, in case that the traveling speed of the mobility vehicle gradually decreases, the amount of outside air introduced into the housing 100 is also decreased to the extent of the decrease in traveling speed. Therefore, it is possible to gradually increase the opening degree of the door 300.

In some examples, the controller 500 may control the drive unit 400 to adjust the opening degree of the door 300 in accordance with the amount of heat exchange by the heat exchanger 210.

In some implementations, the heat exchange unit 200 includes the heat exchanger 210 in which the refrigerant circulates, and the heat exchange unit 200 allows the outside air to exchange heat with the refrigerant flowing through the heat exchanger 210. Therefore, the temperature of the refrigerant flowing through the heat exchanger 210 is adjusted on based on the amount of outside air introduced into the housing 100 through the air inlet port 110.

The heat pump may be implemented by the heat exchanger 210. It is possible to adjust the amount of heat exchange between the heat exchanger 210 and the outside air introduced into the housing 100 by adjusting the opening degree of the door 300 on based on a temperature condition of the refrigerant through the heat exchanger 210. Therefore, at the time of implementing various modes including the heat pump by circulating the refrigerant, the temperature of the refrigerant may be managed by the heat exchanger 210.

In some examples, the controller 500 may control the drive unit 400 to open the door 300 at the time of performing a cleaning mode for removing foreign substances in the housing 100.

The cleaning mode may serve to remove foreign substances in the housing 100 and be particularly performed to prevent dust from being accumulated. The cleaning mode may be performed by an instruction inputted by a user, automatically performed as a predetermined time elapses, or performed on based on the detected amount of dust accumulated in the housing 100.

The cleaning mode allows the door 300 to be opened. In the present disclosure, because the outside air introduced through the air inlet port 110 forms a flow to be discharged through the air discharge port 120, dust may be left unattended and accumulated in a part of the space in the housing 100.

Therefore, the air inlet port 110 is opened as the door 300 is opened at the time of performing the cleaning mode, such that the dust may be discharged to the outside as the outside air is introduced into the air inlet port 110 and then discharged. That is, the dust in the housing 100 is discharged to the outside by the flow of the air that is introduced through the air inlet port 110 and then discharged back to the air inlet port 110 instead of a flow of outside air that moves from the air inlet port 110 to the air discharge port 120.

In addition, the controller 500 may perform the cleaning mode when the mobility vehicle travels, and the controller 500 may control the blower 220 so that the blower 220 does not operate.

That is, the heat exchange unit 200 includes the blower 220 configured to allow the air in the heat exchanger 210 and the housing 100 to pass through the heat exchanger 210 and then be discharged through the air discharge port 120. In this case, the flow of outside air, which flows through the air inlet port 110, may be formed at the time of performing the cleaning mode. Therefore, the blower 220 does not operate so that the outside air does not flow toward the air discharge port 120. Therefore, the outside air flows through the air inlet port 110 while the cleaning mode is performed, such that foreign substances in the housing 100 may be smoothly removed by vehicle-induced wind.

In this case, when a preset predetermined time elapses after the cleaning mode is performed, the controller 500 may control the drive unit 400 to adjust the operation of opening or closing the door 300 in accordance with the logic for each previous situation.

In the cleaning mode, the door 300 is fully opened, such that the amount of outside air flowing toward the heat exchanger 210 may decrease. Therefore, when the preset predetermined time elapses after the cleaning mode is performed, the operation of opening or closing the door 300 is adjusted in accordance with the logic for each previous situation, such that the amount of heat exchange of the heat exchanger 210 is ensured. The predetermined time may be set to a time for which foreign substances in the housing 100 may be sufficiently removed by vehicle-induced wind generated by the mobility vehicle.

According to the air conditioning system for a mobility vehicle structured as described above, the air may be introduced into the housing 100 embedded with the heat exchanger 210 in multiple directions including the forward, rearward, leftward, and rightward directions. Therefore, the outside air may be introduced into the heat exchanger 210 and perform the heat exchange regardless of the traveling direction of the mobility vehicle. In addition, the amount of outside air to be provided to the external heat exchanger 210 is adjusted depending on the traveling direction of the mobility vehicle or whether the heat pump is used, which improves the efficiency in operating the external heat exchanger 210.

While the specific implementations of the present disclosure have been illustrated and described, it will be obvious to those skilled in the art that the present disclosure may be variously modified and changed without departing from the technical spirit of the present disclosure defined in the appended claims.

What is claimed is:

1. An air conditioning system for a mobility vehicle, the air conditioning system comprising:
   a housing that defines an air inlet port and an air discharge port, the air inlet port extending along a rim of the housing;
   a heat exchange unit disposed in the housing;
   a door disposed at the housing and configured to move upward and downward along a height direction of the mobility vehicle to thereby open and close the air inlet port based on the position of the door;
   a drive unit connected to the door and configured to adjust the position of the door in an upward-downward direction extending along the height direction; and
   a controller configured to control the drive unit based on a preset logic,
   wherein the drive unit comprises:
      a drive motor disposed in the housing and configured to generate driving power, and
      a movable member that extends across an inside of the door and is connected to the drive motor and the door, the movable member being configured to move upward or downward along the upward-downward direction by the driving power of the drive motor to thereby move the door in the upward-downward direction, and
   wherein the door includes a guide slit configured to receive the movable member and to guide movement of the movable member in the upward-downward direction.

2. The air conditioning system of claim 1, wherein the air inlet port is defined at a lateral portion of the housing, wherein the air discharge port is defined at an upper portion of the housing in the height direction of the mobility vehicle or at a lower portion of the housing relative to the upper portion, and
   wherein the air discharge port is configured to discharge air that is blown from the air inlet port and passes through the heat exchange unit.

3. The air conditioning system of claim 1, wherein the drive motor is configured to generate a rotational force,
   wherein the drive unit further comprises a gear disposed at an end of the movable member, and
   wherein the door has an engagement end that is engaged with the gear.

4. The air conditioning system of claim 3, wherein the movable member has a rod shape.

5. The air conditioning system of claim 3, wherein the engagement end of the door comprises a rack gear arranged in the upward-downward direction, and
   wherein the gear of the movable member is engaged with the rack gear.

6. The air conditioning system of claim 3, wherein the door defines a first breadth and a second breadth that is smaller than the first breadth, and
   wherein the movable member is disposed inside the door and extends through along a portion of the door having the second breadth.

7. The air conditioning system of claim 1, wherein the housing comprises a plurality of supports that extend across the air inlet port in the upward-downward direction and are spaced apart from one another by predetermined intervals.

8. The air conditioning system of claim 1, wherein the door comprises:
   a first rib disposed at an inside of an edge of the door, and
   a second rib that extends along an outer surface of the door or an inner surface of the door.

9. The air conditioning system of claim 1, wherein the controller is configured to control the drive unit to open the door based on the mobility vehicle traveling at a traveling speed that is greater than or equal to a preset speed.

10. The air conditioning system of claim 9, wherein the controller is configured to:
   decrease an opening degree of the door based on the mobility vehicle accelerating from the traveling speed, and
   increase the opening degree of the door based on the mobility vehicle decelerating from the traveling speed.

11. The air conditioning system of claim 1, wherein the heat exchange unit comprises a heat exchanger configured to circulate a refrigerant, and
   wherein the controller is configured to control the drive unit to adjust an opening degree of the door based on an amount of heat exchange by the heat exchanger.

12. The air conditioning system of claim 1, wherein the controller is configured to control the drive unit to open the door based on the air condition system performing a cleaning mode for removing foreign substances in the housing.

13. The air conditioning system of claim 12, wherein the controller is configured to control the drive unit to adjust an operation for opening or closing the door based on an elapse of a preset predetermined time after the cleaning mode is performed.

14. The air conditioning system of claim 13, wherein the heat exchange unit comprises a heat exchanger and a blower, and
   wherein the controller is configured to:
      perform the cleaning mode based on the mobility vehicle traveling, and
      control the blower not to operate while the mobility vehicle travels.

15. The air conditioning system of claim 1, wherein the housing is configured to be disposed on a roof of the mobility vehicle, the roof defining a lowermost position of the air conditioning system, and wherein the door is configured to move to a first position upward relative to the roof and to move downward from the first position to a second position toward the roof.

\* \* \* \* \*